US010027264B2

(12) United States Patent
Mugnier et al.

(10) Patent No.: US 10,027,264 B2
(45) Date of Patent: Jul. 17, 2018

(54) METHOD FOR GENERATING CONTROL SIGNALS FOR MANAGING THE OPERATION OF A SYNCHRONOUS MOTOR, CONTROL DEVICE AND ACTUATOR

(71) Applicant: SOMFY SAS, Cluses (FR)

(72) Inventors: David Mugnier, Reignier (FR); Florian Germain, Meythet (FR)

(73) Assignee: SOMFY SAS, Cluses (FR)

( * ) Notice: Subject to any disclaimer, the term of this patent is extended or adjusted under 35 U.S.C. 154(b) by 11 days.

(21) Appl. No.: 15/325,283

(22) PCT Filed: Jul. 13, 2015

(86) PCT No.: PCT/EP2015/065926
§ 371 (c)(1),
(2) Date: Jan. 10, 2017

(87) PCT Pub. No.: WO2016/005603
PCT Pub. Date: Jan. 14, 2016

(65) Prior Publication Data
US 2017/0187309 A1    Jun. 29, 2017

(30) Foreign Application Priority Data

Jul. 11, 2014   (FR) ..................... 14 56758

(51) Int. Cl.
*H02P 23/12*    (2006.01)
*H02P 6/15*    (2016.01)
(Continued)

(52) U.S. Cl.
CPC ............ *H02P 6/153* (2016.02); *H02K 11/215* (2016.01); *H02K 11/33* (2016.01); *H02P 6/08* (2013.01)

(58) Field of Classification Search
CPC ......... H02K 11/215; H02K 11/33; H02P 6/08; H02P 6/153
(Continued)

(56) References Cited

U.S. PATENT DOCUMENTS 6,163,117 A    12/2000 Rappenecker

FOREIGN PATENT DOCUMENTS

DE    42 15 812 A1    11/1993
DE    100 33 561 A1    6/2001

OTHER PUBLICATIONS

Babico J: "3-Phase Brushless DC Motor Using a Single Sensor", Motorola Technical Developments, Motorola Inc. Schaumburg, Illinois, US, vol. 9, Aug. 1, 1989 (Aug. 1, 1989), p. 56/57, XP000053786, ISSN: 0887-5286.
(Continued)

*Primary Examiner* — Jorge L Carrasquillo
(74) *Attorney, Agent, or Firm* — Haug Partners LLP

(57) ABSTRACT

The invention relates to a method for generating control signals for managing the operation of a synchronous motor with one or more permanent magnets (1) comprising a stator (2), the stator comprising a number P of phases (3, 4, 5), a rotor, the rotor comprising said permanent magnet or magnets, a switching module (6) provided with a plurality of switches (K1-K6), a number N of Hall-effect sensors sensitive to a rotating electromagnetic field induced by said permanent magnet or magnets, N being no lower than 2 and strictly lower than P, the method comprising a step of acquiring status information transmitted by the sensors (9, 10) and a step of estimating at least one piece of complementary information on the basis of status information transmitted by the sensors (9, 10), the complementary information characterizing the status variation of at least one virtual sensor. The invention also relates to a control device
(Continued)

(10) comprising a module for estimating a piece of complementary information (11) and a module for generating control signals (12) configured to implement the method. The invention further relates to an actuator (9) comprising a synchronous motor with permanent magnets (1) and a control device (10).

13 Claims, 6 Drawing Sheets

(51) Int. Cl.
*H02K 11/215* (2016.01)
*H02K 11/33* (2016.01)
*H02P 6/08* (2016.01)

(58) Field of Classification Search
USPC .................................... 318/400.14, 400.38
See application file for complete search history.

(56) References Cited

OTHER PUBLICATIONS

Nor Zaihar Yahaya et al: "Study of Phase Advance Angle Control (PAAC) Technique for Brushless DC (BLDC) Motor", $2^{nd}$ 2013 IEEE Conference on Control, Systems and Industrial Informatics, Jun. 26, 2013 (Jun. 26, 2013), XP055187589, p. 73-p. 74.
International Search Report and Written Opinion dated Feb. 12, 2016 in corresponding International Application No. PCT/EP2015/065926.

METHOD FOR GENERATING CONTROL SIGNALS FOR MANAGING THE OPERATION OF A SYNCHRONOUS MOTOR, CONTROL DEVICE AND ACTUATOR

CROSS-REFERENCE TO RELATED APPLICATIONS

This application is the National Stage entry under 35 U.S.C. § 371 of International Application No. PCT/EP2015/065926 filed on Jul. 13, 2015, published on Jan. 14, 2016 under Publication Number WO 2016/005603, which claims the benefit of priority under 35 U.S.C. § 119 of French Patent Application Number 1456758 filed Jul. 11, 2014.

TECHNICAL FIELD OF THE INVENTION

The invention relates to the field of actuators equipped with synchronous motors with permanent magnets. The invention in particular pertains to a method for generating control signals for managing the operation of a synchronous motor with one or several permanent magnets equipping such an actuator. The invention also pertains to a control device suitable for carrying out such a method and an actuator comprising a synchronous motor with one or several permanent magnets and a control device.

BACKGROUND OF THE INVENTION

A synchronous motor with permanent magnets generally includes a polyphase stator, made up of one or several coils per phase and a stack of metal sheets making up a magnetic circuit, and a rotor with one or several permanent magnets. Furthermore, in order to determine the angular position of the rotor relative to the coils, sensors are generally positioned on the stator to detect variations of the rotary field induced by the rotor. In practice, these sensors are often angularly offset relative to the coils, for bulk reasons. These sensors in particular deliver information required to be able to generate control signals governing the operation of the motor, but also to determine the position of the rotor (number of revolutions performed, end of travel position, intermediate position, blocked position detection).

In order to generate the control signals of the motor, it is common practice to position, within the stator of the motor, a number of sensors strictly equal to the number of phases of the stator. For example, in the case of a three-phase stator, three Hall effect sensors are in most cases arranged within the stator. The use of a number of sensors strictly equal to the number of phases of the motor is, however, restrictive in terms of bulk and cost.

With a view to reducing the number of sensors used to manage the operation of a synchronous motor with permanent magnets, document U.S. Pat. No. 6,163,117 describes a method for generating control signals that makes it possible to decrease the number of sensors. The disclosed principle amounts to replacing one of the actual sensors with a virtual sensor, i.e., generating an output signal of a fictitious sensor by computation, based on signals provided by the real sensors, which are present in a number smaller than the number of phases. It appears, however, that the disclosed control method does not make it possible to generate control signals for the operation of the motor to be optimized. The method in particular does not offer any flexibility to account for the different possible operating ratings of the motor and optimize the operation of the motor in each of these operating ratings.

BRIEF DESCRIPTION OF THE INVENTION

The invention seeks to resolve the drawbacks of the state of the art. To that end, proposed according to a first aspect of the invention is a method for generating control signals for managing the operation of a synchronous motor with one or more permanent magnets comprising a stator, the stator comprising a number P of phases, a rotor, the rotor comprising said permanent magnet(s), a switching module provided with a plurality of switches, a number N of Hall effect sensors sensitive to a rotating electromagnetic field induced by said permanent magnet(s), N being no lower than 2 and strictly lower than P, the method comprising:
 a step of acquiring status information transmitted by the sensors; and
 a step of estimating at least one piece of complementary information on the basis of status information transmitted by the sensors, the complementary information characterizing the status variation of at least one virtual sensor;
 a step consisting of determining an operating stage of the motor; and
 a step consisting of generating control signals to act on the switches of the switching module based on the status information, and the at least one piece of complementary information and operating stage of the motor.

By taking into account the operating stage of the motor to generate control signals, the operation thereof is optimized, for example in terms of available torque or in terms of thermal performance or output, including when the number of real sensors is lower than the number of phases of the motor.

Preferably, the operating stage belongs to a set of possible stages, including at least two stages from among the following stages: an idle stage, a startup stage, a nominal rating stage, a gradual stop stage and an emergency stop stage.

According to one particularly advantageous embodiment, the operating stage of the motor is determined based on status information transmitted by the Hall effect sensors. The status information transmitted by the Hall effect sensors in particular makes it possible to estimate the direction, speed and acceleration of the motor from the first revolution fractions.

According to one particularly simple embodiment, the possible stages include:
 a first stage during which the control signals are generated with a first predetermined time shift, zero or nonzero, relative to moments marked by a change in status of one of the Hall effect sensors or the virtual sensor, and
 a second stage during which the control signals are generated with a second predetermined time shift different from the first predetermined time shift, zero or nonzero, relative to moments marked by a change in status of one of the Hall effect sensors or the virtual sensor.

This embodiment may in particular be implemented with binary output Hall effect sensors. The first stage may for example be a startup stage, and the second stage a nominal rating stage.

In practice, the control signals are generated during the first stage such that an electrical current circulating between terminals of a winding of a phase of the stator has a first predetermined electrical phase shift, zero or nonzero, relative to a counter-electromotive force induced across the terminals of the winding by the rotating electromagnetic field.

During the second stage, the control signals are generated such that the electrical current circulating between the terminals of the winding of the phase of the stator has a second predetermined electrical phase shift, different from the first predetermined electrical phase shift, relative to the counter-electromotive force induced across the terminals of the winding by the rotating electromagnetic field.

According to one alternative of the invention, the possible stages include the nominal rating stage, during which the step of estimating at least one piece of complementary information comprises:

a step of measuring time intervals between two successive status changes of one of the Hall effect sensors;

a step for computing the mean duration of these intervals; and a step consisting of using the computed mean duration to estimate at least one piece of complementary information.

During the nominal rating stage, the control signals are preferably generated such that an electrical current circulating between terminals of a winding of a phase of the stator has a first predetermined electrical phase shift, zero or strictly less than 15° relative to a counter-electromotive force induced by the rotating electromagnetic field across the terminals of the winding. In the nominal rating, this control strategy makes it possible to optimize the torque and output, and to minimize heat losses.

According to another feature of the invention, the possible stages include the startup stage, and the step of estimating at least one piece of complementary information comprises, during the startup stage:

a step of measuring a duration of a time interval between a status change of a first of the Hall effect sensors and an opposite first status change of a second of the Hall effect sensors that follows the status change of the first of the Hall effect sensors or a duration of a time interval between a status change of the second of the Hall effect sensors and an opposite first status change of the first of the Hall effect sensors that follows the status change of the second of the Hall effect sensors; then a step consisting of using the measured duration to estimate at least one piece of complementary information.

This feature allows greater reactivity during accelerations or decelerations of the motor.

In practice, the control signals are generated during the startup stage such that an electrical current circulating between terminals of a winding of a phase of the stator has a predetermined electrical phase shift of at least 15° and preferably at least 30° relative to a counter-electromotive force induced across the terminals of the winding by the rotating electromagnetic field. This operating mode makes it possible to obtain a significant flux in the magnetic circuit of the stator of the motor, which makes it possible to guarantee a good start up.

According to another alternative of the invention, the step of estimating at least one piece of complementary information comprises:

a step consisting of analyzing status information comprising at least one test to determine whether the status information transmitted by the sensors meets a predetermined sufficiency condition; then if the sufficiency condition is met, a step consisting of deriving the at least one piece of complementary information directly from the analysis;

or, if the sufficiency condition is not met, a step consisting of choosing the at least one piece of complementary information arbitrarily, then deciding, based on status information received later during a time interval with a predefined duration, whether at least one piece of complementary information must be modified.

Alternatively, the step of estimating at least one piece of complementary information comprises:

a step consisting of analyzing status information comprising at least one test to determine whether the status information transmitted by the sensors meets a predetermined sufficiency condition; then if the sufficiency condition is met, a step consisting of deriving the at least one piece of complementary information directly from the analysis;

or, if the sufficiency condition is not met, a step consisting of determining the at least one piece of complementary information based on the analysis and a rotation direction of the motor.

According to one preferred embodiment, P=3 and N=2. The method for generating control signals according to the invention therefore advantageously applies to the motor comprising a three-phase stator.

According to another aspect of the invention, it pertains to a device for controlling a synchronous motor with permanent magnets, which comprises a module for estimating at least one piece of complementary information and a module for generating control signals that are configured to carry out the method previously described.

According to still another aspect of the invention, it pertains to an actuator comprising a synchronous motor with permanent magnets comprising a stator, the stator comprising a plurality of windings making up a number P of phases, P being no lower than 2, a rotor, the rotor comprising a number A of permanent magnets, A being greater than or equal to 1, a switching module provided with a plurality of switches, a number N of Hall effect sensors, the Hall effect sensors being sensitive to a rotating electromagnetic field induced by the permanent magnets, N being no lower than 1 and strictly lower than P, the actuator comprising a control device as previously defined, connected to the Hall effect sensors and the switching module 6.

Advantageously, the Hall effect sensors are arranged on a shared electronic circuit support element positioned within the stator, the shared support element preferably being in the shape of a disc, disc segment, ring or ring segment. Such a configuration is particularly suitable for a tubular motor widely used for example in the home automation field.

In order to provide a certain degree of flexibility in choosing the positioning of the sensors within the motor, it is possible to provide that the shared support element comprises a plurality of housings, and preferably a number P of housings, each of the housings being suitable for receiving a Hall effect sensor. Preferably, the shared support element comprises three housings and two Hall effect sensors. According to one embodiment, the housings are arranged at angular intervals of 60° or 120° around a rotation axis of the rotor.

According to one preferred embodiment, the Hall effect sensors are binary output Hall effect sensors. Alternatively, the Hall effect sensors are analog output Hall effect sensors, connected to a post-treatment stage delivering binary signals.

According to one preferred embodiment, the number A is equal to two or four.

According to another aspect, the invention relates to a method for generating control signals for managing the operation of a synchronous motor with one or more permanent magnets comprising a stator, the stator comprising a number P of phases, a rotor, the rotor comprising said permanent magnet(s), a switching module provided with a plurality of switches, a number N of Hall effect sensors sensitive to a rotating electromagnetic field induced by said permanent magnet(s), N being no lower than 2 and strictly lower than P, the method comprising:

- a step of acquiring status information transmitted by the sensors; and
- a step consisting of determining an operating stage of the motor; and
- a step consisting of generating control signals to act on the switches of the switching module based on the status information, the operating stage of the motor, and at least one piece of complementary information characterizing the evolution of the status of at least one virtual sensor, and obtained based on status information sent by the sensors during an estimating step, including:
  - a step consisting of analyzing status information comprising at least one test to determine whether the status information transmitted by the sensors meets a predetermined sufficiency condition; then
  - if the sufficiency condition is met, a step consisting of deriving the at least one piece of complementary information directly from the analysis;
  - or, if the sufficiency condition is not met, a step consisting of choosing the at least one piece of complementary information arbitrarily, then deciding, based on status information received later during a time interval with a predefined duration, whether at least one piece of complementary information must be modified.

It is of course possible to combine different aspects or embodiments of the invention with one another to define others.

BRIEF DESCRIPTION OF THE FIGURES

Other features and advantages of the invention will emerge from reading the following description, in reference to the appended figures, which illustrate.

For greater clarity, identical elements are identified using identical reference signs in all of the figures.

DETAILED DESCRIPTION OF THE INVENTION

Figure 1:
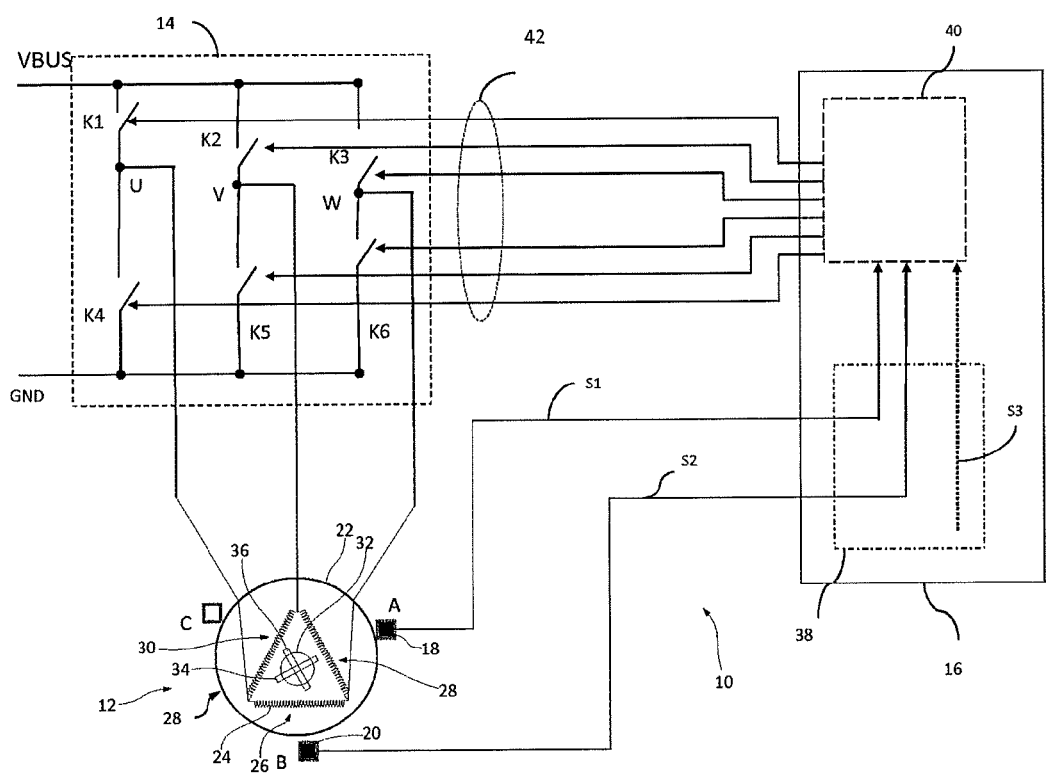
FIG. 1, a diagrammatic view of an actuator according to the invention.

FIG. 1 diagrammatically shows an actuator 10 according to the invention. The actuator 10, which is intended to drive the piece of home automation equipment, for example a protective or concealing screen, comprises a synchronous motor 12 with permanent magnets, a switching module 14 of the motor and a control device 16 that is connected to sensors 18, 20 and the switching module 14.

The motor 12 is made up of a stator 22 comprising a stack of metal sheets (not shown) forming a magnetic circuit, and windings 24 forming three phases 26, 28, 30 arranged at 120° from one another, and a rotor 32 with two permanent magnets 34, 36.

In a known manner, the switching module 14 includes a plurality of power switches (K1-K6), which, based on received control signals, sequentially power the phases 26, 28, 30 of the motor so as to create a rotating magnetic field. The control sequences are generated based on the relative position of the rotor 32 with respect to the windings 24 of the stator 22. Thus, the position of the switches (K1-K6) at a given moment constitutes a control which, via the phases 26, 28, 30 of the motor 12, determines its operation.

The switching module 14 is controlled by the control device 16, which comprises a module 38 for estimating the output signal of a virtual sensor and a module 40 for generating control signals 42. Each of these modules comprises hardware and software means arranged and configured so that the control device 16 implements the method for generating control signals to manage the operation of the motor, as will be described below.

The module 38 for estimating the output signal of a virtual sensor is connected to the two Hall effect sensors 18, 20 positioned stationary relative to the stator 22, preferably integrated therewith. Preferably, these sensors 18, 20 are binary output Hall effect sensors. Preferably, these sensors are positioned at 120° or 60° from one another within the stator 22.

As will be described later, the estimating module makes it possible to estimate, from status signals S1, S2 of the two real sensors 18 and 20, a signal S3 as would be delivered by a third sensor angularly offset relative to the real sensors 18 and 20. This signal generated by the estimating module 11 thus characterizes the evolution of the status of a fictitious sensor which, unlike the real sensors 18, 20, is qualified in the present application as a virtual sensor.

Thus, while three sensors are normally needed for a complete determination of the control signals 42 and the position of the rotor 32 for a motor provided with a three-phase stator, the motor 12 of the actuator 10 according to the invention comprises only two so-called real sensors 18, 20. The method that will be described in detail below therefore makes it possible to generate control signals 42 to act on the switches K1 to K6 of the switching module 14 of the motor starting from signals S1, S2 provided by only two real sensors 18 and 20, and going through an intermediate step for building a signal S3 of a virtual sensor, from the signals S1 and S2.

Figure 2:
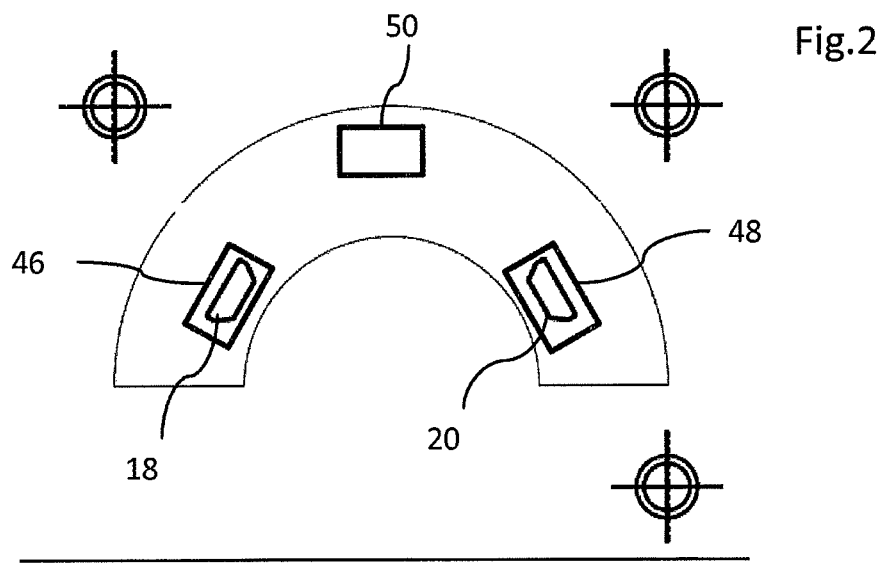
FIG. 2, a diagrammatic view of a shared circuit support element of the synchronous motor with permanent magnets of an actuator according to the invention.

FIG. 2 diagrammatically illustrates a shared support element 44 arranged within the stator 22 of the motor 12 and on which the sensors 18, 20 are positioned. The shared support element 44 is substantially planar and is preferably in the shape of a ring segment, as shown in FIG. 2. This shape is particularly advantageous in terms of bulk, in particular for a tubular motor. Alternatively, the shared support element 44 may assume the form of a ring, disc or disc segment. The shared support element 44 comprises three housings 46, 48, 50, all suitable for receiving a sensor. The first sensor 18 is arranged in a first housing 46, the second sensor 20 is arranged in a second housing 48, while a third housing 50 is used in the design phase to house a third real sensor, and validate the method for generating control signals, and during the operating phase to house the connector technology for the two sensors 18, 20.

Figure 3:
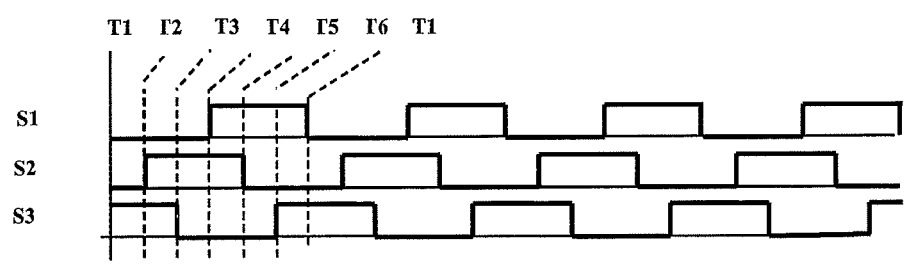
FIG. 3, a diagrammatic view of status signals from Hall effect sensors of a synchronous motor with a three-phase stator of the state of the art.

For a better understanding of the description of the method according to the invention, FIG. 3 illustrates the signals delivered by three sensors arranged in a conventional synchronous motor with permanent magnets with a three-phase stator. These binary signals are phase-shifted relative to one another. The corresponding truth table is established below:

| | Signals | | |
|---|---|---|---|
| Moment | S1 | S2 | S3 |
| T1 | 0 | 0 | 1 |
| T2 | 0 | 1 | 1 |
| T3 | 0 | 1 | 0 |
| T4 | 1 | 1 | 0 |
| T5 | 1 | 0 | 0 |
| T6 | 1 | 0 | 1 |

To eliminate one of the sensors, the method according to the present invention includes an estimating algorithm, illustrated by FIGS. 4 to 7 and executed by the estimating module 38, which makes it possible to estimate the signal S3 characterizing the evolution of the status of a virtual sensor based on the status signals S1 and S2 transmitted by the real sensors 18 and 20. The signals S1, S2 from the real sensors and the signal S3 resulting from the estimating algorithm next feed an algorithm for generating control signals, executed by the module 40 as described in relation to FIGS. 8 and 9, which makes it possible to determine the moments at which the control signals are sent to the switching module 14.

The algorithm for estimating the signal S3 can be divided into three successive phases, namely an initialization phase implemented upon startup, when the motor leaves an idle stage, followed by an acceleration phase during which the speed of the motor is not constant, lastly followed by a constant speed phase corresponding to a nominal rating. If applicable, the estimation of the signal S3 in a later deceleration phase may follow the same algorithm as in the constant speed phase.

During the initialization phase, the goal is to determine, with very little available data, an initial value of the signal S3 from the virtual sensor. In this phase, the observations made on the preceding truth table are used: upon reading this table, one can see that when both sensors 18 and 20 have the same status (for example, sensor 18 and sensor 20 with the same status "00" or "11"), then the third sensor necessarily has the opposite status. This first observation makes it possible to determine the status signal S3 of the third sensor, here the virtual sensor, when the status signals S1, S2 of the two real sensors 18 and 20 are identical.

Figure 4:
FIG. 4, a first diagrammatic view of status signals of the sensors during the implementation of the method for generating control signals according to the invention.
Figure 5:
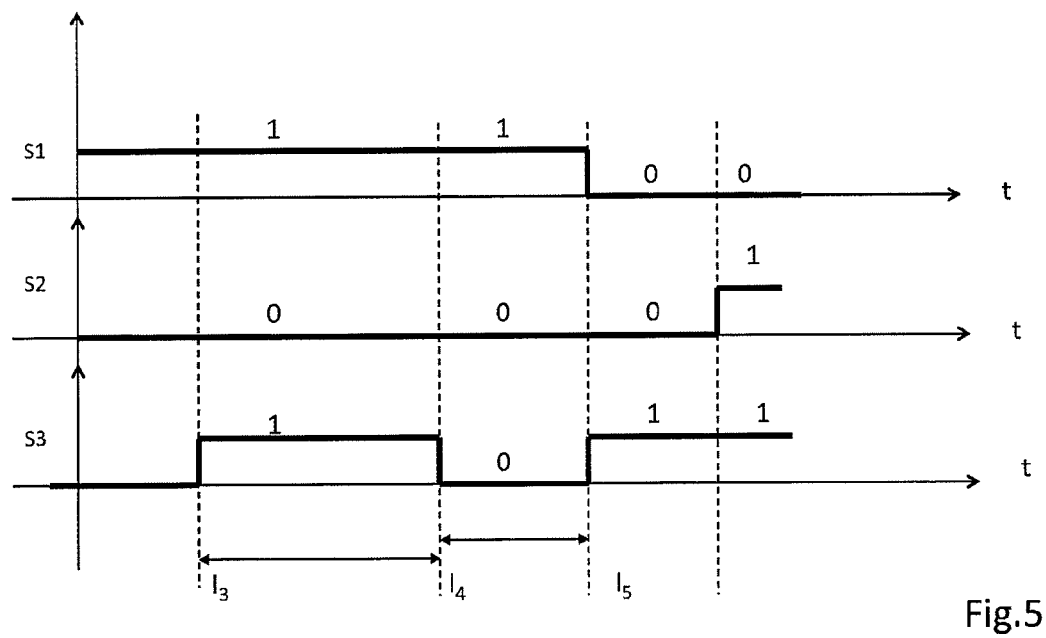
FIG. 5, a second diagrammatic view of status signals of the sensors during the implementation of the method for generating control signals according to the invention.

A first embodiment of the algorithm for this initialization phase is illustrated in FIGS. 4 and 5, where the evolutions as a function of time are shown of the signals S1 and S2 of the real sensors 18 and 20 and the reconstituted signal S3 from the virtual sensor.

FIG. 4 illustrates a case in which the initial status of the signals S1 and S2 does not leave any choice regarding the value of the signal S3. The signals S1 and S2 initially being at 0 when the motor is stopped (moment 10), the signal S3 has been positioned at 1 (only compatible value according to the truth table). When the motor is started up, the rotation of the motor first drives a status change of the signal S1 at moment 11. The new status of the signals S1 and S2, i.e., "1" and "0", being compatible with the preceding value of S3 ("1"), the latter is retained. Then the signal S2 changes status in turn at moment 12, and the preceding value of the signal S3 becomes incompatible with the new status of the signals S1 and S2. The module for estimating the output signal of a virtual sensor 38 then modifies the value S3, which completes this initialization phase.

FIG. 5 illustrates a situation in which the initial values of the signals S1 and S2 do not make it possible to unambiguously determine the signal S3 at the same moment. The status of the virtual sensor is first determined arbitrarily from among the statuses compatible with the statuses of the real sensors 18 and 20 (for example at moment 13 in FIG. 5), then this arbitrary status is next maintained for a time interval with a predetermined duration. If, during this time interval, the status signals S1 and S2 transmitted by the real sensors do not show any variation, the status S3 of the virtual sensor is modified (here at moment 14 in FIG. 5). This process is carried out in a loop for a certain length of time. Advantageously, it is possible to consider varying the duration of the time interval based on a desired startup direction, a temperature or initial conditions. Similarly to the first embodiment, the initialization phase finishes upon the first status change of one of the signals S1 and S2, which, following an incompatibility with the current signal S3, causes a modification of the status of the latter, here at moment 15 identified in FIG. 5.

Figure 6A:
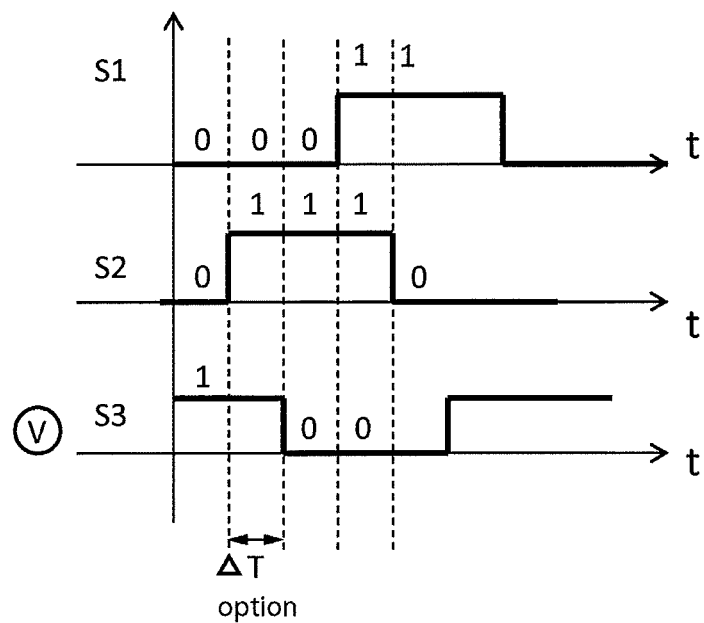
FIG. 6A, a third diagrammatic view of status signals of the sensors during the implementation of the method for generating control signals according to the invention.
Figure 6B:
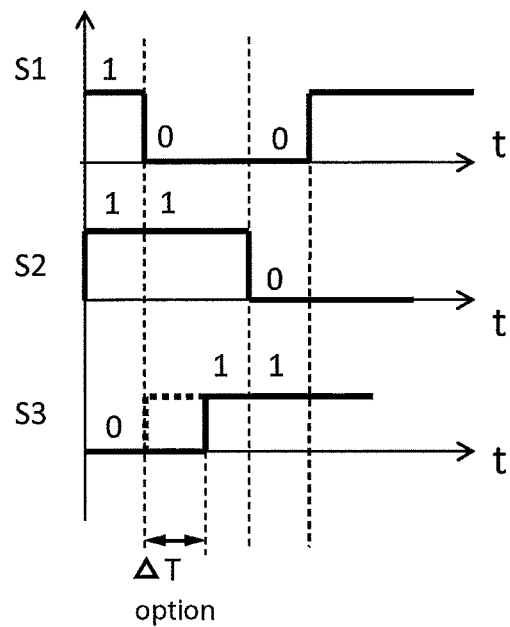
FIG. 6B, a fourth diagrammatic view of status signals of the sensors during the implementation of the method for generating control signals according to the invention.

According to a second embodiment of the algorithm implemented in the initialization phase, illustrated in FIGS. 6A and 6B, the status of the virtual sensor is determined by the computation based on the values of the real sensors and the known predetermined rotation direction. To implement this embodiment, the motor should have previously saved sequences of values of the signals S1, S2 from the real sensors corresponding to the rotation directions. These sequences can be predefined or learned during an installation step. In the case illustrated in FIG. 6A, the motor is powered so as to rotate in the counterclockwise direction. In the presence of a signal S1 assuming the value "0" and a signal S2 assuming the value "0" at the initial moment of the stop, the algorithm initially gives the value "1" to S3 (only compatible value according to the truth table), then, after the first observed status change (here the transition to the value "1" of the signal S2), the evolution of the signal S3 is estimated by a value assigned to the signal S3 and a transition moment, when the signal actually assumes the assigned value. This assigned value depends on the rotation direction, and therefore the next sequences for the values of the signals S1, S2. In the illustrated example, the sequence (0,1) of the signals S1, S2 is followed by a sequence (1,1). The value assigned to S3 is therefore 0. The algorithm generates a transition to the value "0" of the signal S3 simultaneously with the transition of the signal S2 (not shown), or after a time delay ΔT (as illustrated by FIG. 6A). The value assigned to S3 during a sequence change of the signals S1, S2 and the potential delay ΔT of the transition of signal S3 relative to the transition of signal S2 results from prior learning. FIG. 6B illustrates a case where the motor is powered in the clockwise direction. Initially, the signals S1 and S2 are in state "1", which imposes state "0" on S3. As a result of the first transition of the signal S1, the sequence of signals S1, S2 becomes (0,1). Contrary to the example illustrated in FIG. 1, the following sequence for the signals S1, S2 is (0,0) in the considered rotation direction. The value assigned to S3 is therefore 1, and the transition is triggered either simultaneously with the transition of the signal S1, or after a time delay ΔT. The sequences of the values of the signals S1, S2, coming from the real sensors, as well as the time delay duration must have been subject to prior learning for each rotation direction.

Figure 7:
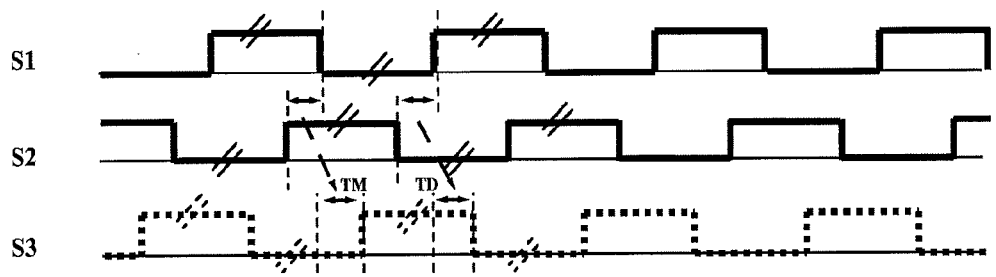
FIG. 7, a fifth diagrammatic view of status signals of the sensors during the implementation of the method for generating control signals according to the invention.

The initialization phase is followed by the acceleration phase, during which the status of the virtual sensor is determined, for a given rotation direction, also taking into account the time elapsed since the last transition of a signal from a real sensor, as illustrated in FIGS. 4 and 7. The estimating module 38 first measures the duration TM between a rising edge (transition from the low state or "0" to the high state of or "1") of a first of the sensors A and B and a falling edge (transition from the high state or "1" to the low state or "0") of the other of the sensors A and B to generate, after a length of time equal to TM from the falling edge of the other real sensor, a rising edge of the signal of the virtual sensor. Thus, at moment 12' in FIG. 4, a transition of the signal S1 is observed. The duration TM between moments 12 and 12' is stored as time delay value to generate, at a moment 12", after 12' by a time equal to TM, a new status change of S3. A similar transition is illustrated in FIG. 7. Then, secondly, the estimating module 11 measures the duration TD (FIG. 7) between the following falling edge of the first of the sensors A and B and the rising edge of the other of the sensors A and B to generate, after a length of time equal to TD from the rising edge of the other real sensor, a falling edge of the signal of the virtual sensor. The construction of the virtual signal by the estimating module 38 thus continues, closer and closer. The acceleration phase continues as long as the rotation speed varies monotonously, therefore for example as long as the time interval between two successive status changes of the signal S1 decreases. The advantage of this method for determining the signal characterizing the status of the virtual sensor is that it allows high reactivity during acceleration phases.

The acceleration phase is followed by a nominal rating phase, during which the signal characterizing the status of the virtual sensor is determined taking into account the duration of the time intervals between two successive status changes of one or the other of the real sensors. In particular, by computing the mean duration of these intervals, it is possible to predict that, by analogy, the status changes of the virtual sensor must follow one another at regular time intervals with a duration substantially identical to the mean duration.

As shown by the elements above, the algorithm for generating the signal S3 makes it possible to reconstruct the signal characterizing the status of a virtual sensor from information provided by the real sensors.

Figure 8:
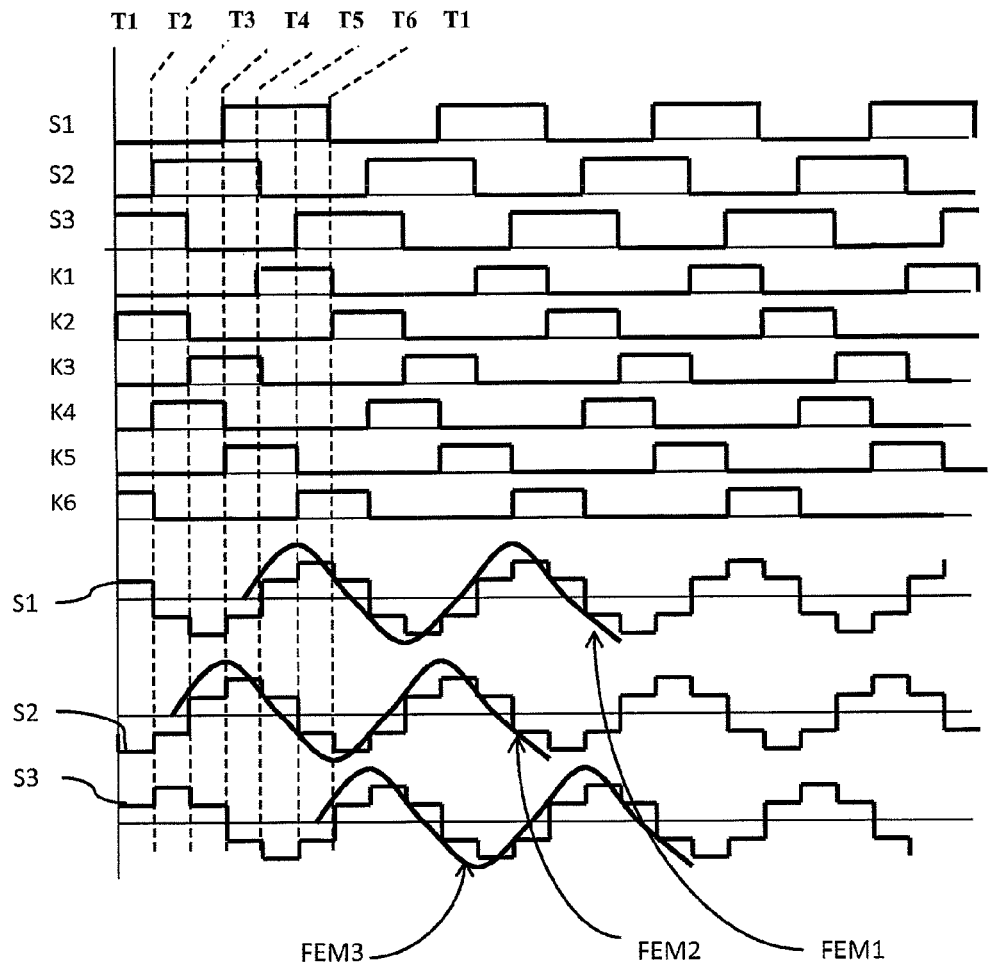
FIG. 8, a diagrammatic view of operating signals of a synchronous motor with a three-phase stator, in the startup and acceleration phase.
Figure 9:
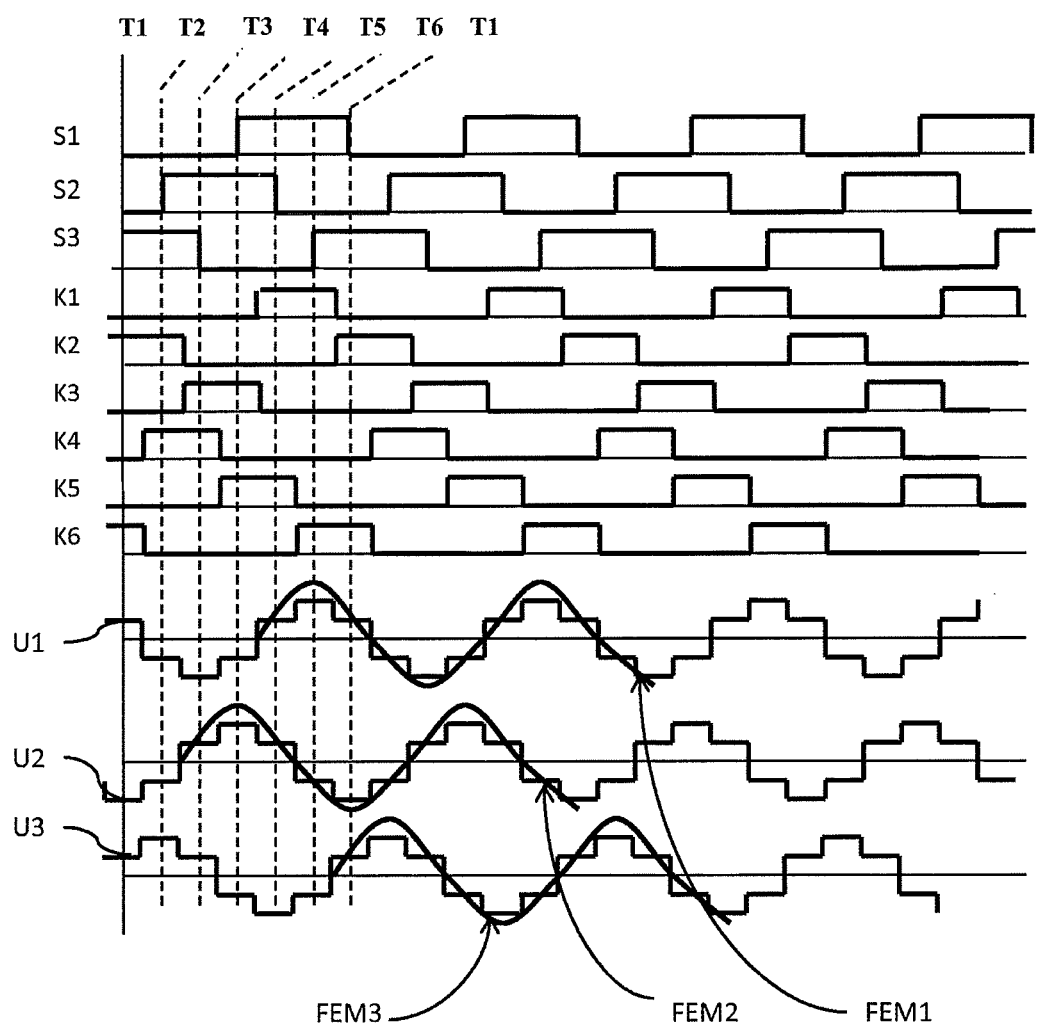
FIG. 9, a diagrammatic view of operating signals of a synchronous motor with a three-phase stator, in the nominal rating with a constant rotation speed.

Based on status signals from the real sensors and the reconstituted signal from the virtual sensor, the second algorithm, illustrated in FIGS. 8 and 9, is intended to determine the moments at which the control signals are sent, and more generally to allow the establishment of the control signals to act on the switches of the switching module 14. These moments are in particular determined taking into account the operating state of the motor (idle, startup, acceleration, nominal rating, deceleration, emergency stop, etc.). The passages to the startup, gradual stop or emergency stop stages are done upon order from the user or detection of an anomaly. However, the passage from the startup stage to the nominal rating stage is done based on evolution criteria of the position of the rotor.

FIG. 8 illustrates the operating signals of the synchronous motor with permanent magnets with a three-phase stator in the acceleration phase at the startup moment, and FIG. 9 shows the corresponding signals in the nominal rating at a constant speed, based on the signals S1 and S2 of the real sensors 18 and 20 and the signal S3 computed by the estimating module 38. The top part of each of FIG. 8 in 9 illustrates the status signals S1, S2, S3. The following six curves illustrate the evolution of the status of each of the switches (K1 to K6) induced by the status signals of the sensors as a function of time. The bottom part of each figure lastly illustrates the corresponding phase voltage U1, U2, U3 (stair step functions) and the electromotive force FEM1, FEM2, FEM3 induced across the terminals of each of the phases (smoothed functions). It should be noted that the phase current is substantially in phase with the phase voltage.

In the startup and acceleration stages, in FIG. 8, when the rotation speed increases from the stop to a nominal value, the switching, i.e., the sending, by the generating module 40 integrated into the control device 16, of control signals controlling the switching of the switches K1 to K6 of the switching module 14, is synchronized so as to ensure a sufficient predetermined phase shift between the electric current traversing a stator winding (or the phase voltage, current and voltage being substantially in phase) and the counter-electromotive force FEM1, FEM2, FEM3, i.e., the voltage induced across the terminals of this same winding by the moving magnets. More specifically, one can see in the example of FIG. 8 that for each phase, the voltage across the terminals of the windings of the phase (periodic or quasiperiodic stair step function) is phase-shifted relative to the electromotive force induced by the permanent magnets (in the case at hand, with a phase delay of about $\frac{1}{12}$th of the time period of the voltage).

The goal during this phase is to guarantee the startup and maximize the torque, even if it means temporarily deteriorating the speed, increasing the intensity of the current and the dissipated heat. In practice, and taking into account the physical angular shift existing between the fixed sensors 18 and 20 and the windings 24, this result is obtained in this embodiment by synchronizing the switching of the switches on the output edges of the signals of the real sensors 18 and 20 and the virtual sensor. In other words, the control signals are sent at the moments marked by a status change of one of the real sensors or the virtual sensor. However, let us add that this perfect synchronism is only encountered if the angular positioning of the fixed sensors 18 and 20 relative to the windings 24 has been chosen carefully. More generally, for any angular positioning, it will be noted that the desired phase shift in the startup and acceleration phase between voltage across the terminals of the windings of a phase and electromagnetic force induced by the permanent magnets in these same windings corresponds to a predetermined phase shift D1, zero or nonzero, between the switchovers of the switches K1 to K6 and the status changes of the sensors.

The corresponding truth table, in a given rotation direction, is established below:

| | Truth Table | | | | | | | |
|---|---|---|---|---|---|---|---|---|
| | Signals | | | Activation with a phase shift D1 (zero) | | | | |
| Moment | S1 | S2 | S3 | K1 | K2 | K3 | K4 | K5 | K6 |
| T1 | 0 | 0 | 1 | 0 | 1 | 0 | 0 | 0 | 1 |
| T2 | 0 | 1 | 1 | 0 | 1 | 0 | 1 | 0 | 0 |
| T3 | 0 | 1 | 0 | 0 | 0 | 1 | 1 | 0 | 0 |
| T4 | 1 | 1 | 0 | 0 | 0 | 1 | 0 | 1 | 0 |
| T5 | 1 | 0 | 0 | 1 | 0 | 0 | 0 | 1 | 0 |
| T6 | 1 | 0 | 1 | 1 | 0 | 0 | 0 | 0 | 1 |

In the nominal rating, in FIG. 9, when the rotation speed is constant and equal to the nominal speed, the synchronization is done such that the voltage in the windings 24 is in phase with the counter-electromotive force, which limits the flow in the magnetic circuit, therefore the heating and losses.

In practice, in the example illustrated in FIG. 9, this operating mode is obtained by a phase shift D2 of the switches K1 to K6 relative to the status signals S1, S2 and S3 of the real and virtual sensors, different from the phase shift D1 encountered in the startup and acceleration phase. More specifically and as an illustration, FIG. 8 shows a phase delay of one twelfth of the period of the voltage signal. The corresponding activation table is established below:

| | Activation table | | | | | | | |
|---|---|---|---|---|---|---|---|---|
| | Signals | | | Activation with a phase shift D2 | | | | |
| Moment | S1 | S2 | S3 | K1 | K2 | K3 | K4 | K5 | K6 |
| T1 | 0 | 0 | 1 | 0 | 1 | 0 | 1 | 0 | 0 |
| T2 | 0 | 1 | 1 | 0 | 0 | 1 | 1 | 0 | 0 |
| T3 | 0 | 1 | 0 | 0 | 0 | 1 | 0 | 1 | 0 |
| T4 | 1 | 1 | 0 | 1 | 0 | 0 | 0 | 1 | 0 |
| T5 | 1 | 0 | 0 | 1 | 0 | 0 | 0 | 0 | 1 |
| T6 | 1 | 0 | 1 | 0 | 1 | 0 | 0 | 0 | 1 |

In summary, the control signals are generated with a zero or nonzero time shift relative to the moments marked by a status change of one of the sensors 18 or 20 (signals S1 and S2) or the virtual sensor (signal S3), which at least assumes a first value D1 in the startup and/or acceleration phase, and a second value D2 in the nominal rating, depending on whether one wishes to maximize the reactivity of the system (upon startup) or the output (in the nominal rating).

In practice, the time shift applied to send control signals is determined in the startup stage and the nominal rating, based on the number of permanent magnets 34, 36, an angle defined by the position of a first sensor 18 and the position of a second sensor 20 adjacent to the first sensor and an angle defined by the position of the first sensor 18 and the position of the phase 30, i.e., the winding, with which it is associated.

Of course, various alternatives are possible. It is in particular possible to provide a continuous variation of the phase shift between phase voltage and the switches of the sensors when the rotation speed increases, such that the phase shift between phase voltage and induced counter-electromotive force decreases continuously when the speed increases. It is also possible to use a variation by plateaus. The rotation speed can be estimated simply by the time separating two status changes of a same sensor 18 or 20. This evolution is reflected in the second process by a continuous variation of the time shift between the status changes of the signals S1, S2 and S3, and the switching orders K1 to K6.

Although for clarity reasons, the above description limited itself to the case of a stator comprising three phases configured in a triangle and a rotor comprising two magnets, the method for generating control signals according to the invention may be implemented for any type of stator-rotor configuration, and in particular a star configuration. In other words, the method according to the invention applies to any type of polyphase stator and irrespective of the number of permanent magnets supported by the rotor.

The invention claimed is:

1. A method for generating control signals for managing the operation of a synchronous motor with one or more permanent magnets, the motor comprising:
   a stator, the stator comprising a number P of phases,
   a rotor, the rotor comprising said one or more permanent magnets,
   a switching module provided with a plurality of switches, and
   a number N of Hall effect sensors sensitive to a rotating electromagnetic field induced by said permanent magnet(s), N being no lower than 2 and lower than P,
   the method comprising:
      a step of acquiring status information transmitted by the sensors; and
      a step of estimating at least one piece of complementary information on the basis of the status information transmitted by the Hall effect sensors, the complementary information characterizing a status variation of at least one virtual sensor;
   wherein the method further comprises:
      a step of identifying an operating stage of the motor in a set of possible stages, the set of possible stages including at least two stages from among the following stages:
         an idle stage, a startup stage, a nominal rating stage, a gradual stop stage, and an emergency stop stage; and
      a step of generating control signals to act on the switches of the switching module based on the status information, the at least one piece of complementary information, and the identified operating stage of the motor,
   wherein the operating stage of the motor is determined based on the status information transmitted by the Hall effect sensors
   wherein the set possible stages further include:
      a first stage during which the control signals are generated with a first predetermined time shift, zero or nonzero, relative to moments marked by a change in status of one of the Hall effect sensors or the virtual sensor, and
      a second stage during which the control signals are generated with a second predetermined time shift different from the first predetermined time shift, relative to moments marked by a change in status of one of the Hall effect sensors or the virtual sensor.

2. The method for generating control signals according to claim 1, wherein the nominal rating stage is a stage during which the step of estimating at least one piece of complementary information comprises:
   a step of measuring time intervals between successive status changes of one of the Hall effect sensors;

a step for computing the mean duration of the measured time intervals; and a step of using the computed mean duration to estimate at least one piece of complementary information.

3. The method for generating control signals according to claim 1, wherein the startup stage is a stage during which the step of estimating at least one piece of complementary information comprises:
   a step of measuring a duration of a time interval between a status change of a first of the Hall effect sensors and an opposite first status change of a second of the Hall effect sensors that follows the status change of the first of the Hall effect sensors; or
   a step of measuring a duration of a time interval between a status change of the second of the Hall effect sensors and an opposite first status change of the first of the Hall effect sensors that follows the status change of the second of the Hall effect sensors; then
   a step of using the measured duration to estimate at least one piece of complementary information.

4. The method for generating control signals according to claim 1, wherein the step of estimating at least one piece of complementary information comprises:
   a step of analyzing status information comprising comparing comparing the status information transmitted by the sensors to predetermined values; and
   if the status information corresponds to the predetermined values, a step of deriving the at least one piece of complementary information directly from the analysis; or,
   if the status information does not correspond to the predetermined values, a step of choosing the at least one piece of complementary information arbitrarily, and based on status information received later during a time interval with a predefined duration, determining whether the at least one piece of complementary information must be modified.

5. The method for generating control signals according to claim 1, wherein the step of estimating at least one piece of complementary information comprises:
   a step of analyzing status information comprising comparing comparing the status information transmitted by the sensors to predetermined values; and
   if the status information corresponds to the predetermined values, a step of deriving the at least one piece of complementary information directly from the analysis; or,
   if the status information does not correspond to the predetermined values, a step of determining the at least one piece of complementary information based on the analysis and a rotation direction of the motor.

6. A device for controlling a synchronous motor with permanent magnets, comprising:
   a module for estimating at least one piece of complementary information; and
   a module for generating control signals that are configured to carry out the method according to claim 1.

7. An actuator comprising a synchronous motor with permanent magnets the motor comprising:
   a stator, the stator comprising a plurality of windings making up a number P of phases, P being no lower than 2,
   a rotor, the rotor comprising a number A of permanent magnets, A being greater than or equal to 1,
   a switching module provided with a plurality of switches, and
   a number N of Hall effect sensors, the Hall effect sensors being sensitive to a rotating electromagnetic field induced by the permanent magnets, N being no lower than 1 and lower than P,
   wherein the actuator further comprises a control device connected to the Hall effect sensors and the switching module,
   wherein the control device acquires status information transmitted by the sensors;
   wherein the control device estimates at least one piece of complementary information on the basis of the status information transmitted by the Hall effect sensors, the complementary information characterizing a status variation of at least one virtual sensor;
   wherein the control device is configured to identifying an operating stage of the motor in a set of possible stages, the set of possible stages including at least two stages from among the following stages:
   an idle stage, a startup stage, a nominal rating stage, a gradual stop stage, and
   an emergency stop stage;
   wherein the control device generates control signals to act on the switches of the switching module based on the status information, the at least one piece of complementary information, and the identified operating stage of the motor;
   wherein the operating stage of the motor is determined based on the status information transmitted by the Hall effect sensors; and
   wherein the set possible stages further include:
   a first stage during which the control signals are generated with a first predetermined time shift, zero or nonzero, relative to moments marked by a change in status of one of the Hall effect sensors or the virtual sensor, and
   a second stage during which the control signals are generated with a second predetermined time shift different from the first predetermined time shift, relative to moments marked by a change in status of one of the Hall effect sensors or the virtual sensor.

8. The actuator according to claim 7, wherein the Hall effect sensors are arranged on a shared electronic circuit support element positioned within the stator, the shared support element being in the shape of a disc, disc segment, ring, or ring segment.

9. The actuator according to claim 8, wherein the shared support element comprises a plurality of housings each of the housings being suitable for receiving a Hall effect sensor.

10. The actuator according to claim 9, wherein the plurality of housings comprise a number P of housings.

11. The actuator according to claim 7, wherein the Hall effect sensors are binary output Hall effect sensors.

12. The actuator according to claim 7, wherein the Hall effect sensors are analog output Hall effect sensors, connected to a post-treatment stage, delivering binary signals.

13. The actuator according to claim 7, wherein the number A is equal to two or four.

* * * * *